United States Patent [19]
Witte et al.

[11] Patent Number: 5,804,646
[45] Date of Patent: Sep. 8, 1998

[54] POWDER PAINT BINDER COMPOSITION

[75] Inventors: Franciscus M. Witte, Utrecht; Richard A. Bayards; Marten Houweling, both of Zwolle, all of Netherlands

[73] Assignee: DSM N.V., Heerlen, Netherlands

[21] Appl. No.: 928,405

[22] Filed: Sep. 12, 1997

Related U.S. Application Data

[63] Continuation of Ser. No. 531,770, Sep. 21, 1995, abandoned.

[30] Foreign Application Priority Data

Sep. 21, 1994 [BE] Belgium .............................. 09400850

[51] Int. Cl.$^6$ ................................ C08J 3/00; C08K 3/20; C08L 75/00; B05D 1/04
[52] U.S. Cl. ......................... 524/590; 427/474; 427/545; 427/557; 427/559; 427/372.2; 427/375; 427/385.5; 427/388.2; 524/539; 524/507; 524/589; 525/124; 528/45
[58] Field of Search ..................... 524/539, 589, 524/590, 507; 528/45; 525/124; 427/474, 545, 557, 559, 372.2, 375, 385.5, 388.2

[56] References Cited

U.S. PATENT DOCUMENTS

| | | | |
|---|---|---|---|
| 3,721,645 | 3/1973 | Zemlin | 260/45.8 N |
| 4,150,211 | 4/1979 | Müller et al. | 528/45 |
| 4,246,368 | 1/1981 | Murase | 525/117 |
| 4,281,076 | 7/1981 | Kamimura | 525/124 |
| 4,354,014 | 10/1982 | Wolf et al. | 528/45 |
| 4,482,721 | 11/1984 | Wegner et al. | 548/262 |
| 4,500,696 | 2/1985 | Gras | 528/45 |
| 4,997,901 | 3/1991 | Yamada et al. | 528/67 |
| 5,100,731 | 3/1992 | Yamada et al. | 428/423.1 |
| 5,232,988 | 8/1993 | Venham et al. | 525/174 |
| 5,472,649 | 12/1995 | Chang et al. | 264/15 |

FOREIGN PATENT DOCUMENTS

| | | |
|---|---|---|
| A1 004 571 | 10/1979 | European Pat. Off. . |
| A1 0 023 023 | 1/1981 | European Pat. Off. . |
| A1 0 285 859 | 10/1988 | European Pat. Off. . |
| A2 0 557 822 | 9/1993 | European Pat. Off. . |
| WO 93/23447 | 11/1993 | WIPO . |

*Primary Examiner*—Patrick D. Niland
*Attorney, Agent, or Firm*—Pillsbury, Madison & Sutro LLP; Cushman Darby & Cushman Intellectual Property Group

[57] ABSTRACT

The invention relates to a powder paint binder composition. The binder composition comprises a hydroxyl functional polymer and a crosslinker containing blocked isocyanate groups. The crosslinker includes (i) a crystalline compound containing blocked isocyanate groups and ii) an amorphous compound containing blocked isocyanate groups. Preferably the crosslinker is a mixture of blocked hexamethylene diisocyanate trimer and blocked 1,6-hexamethylene diisocyanate.

17 Claims, No Drawings

POWDER PAINT BINDER COMPOSITION

This is a continuation of application Ser. No. 08/531,770, filed on Sep. 21, 1995, which was abandoned.

BACKGROUND OF THE INVENTION

1. Field of the Invention

The invention relates to a powder paint binder composition, and more particularly to a binder composition comprising a hydroxyl functional polymer and a crosslinker containing blocked isocyanate groups.

2. Description of Related Art

Powder paints or powder coatings are useful in among other things, protecting automotive substrates. Powder paint compositions include as a major component a binder composition. For example, binder compositions are described in WO 93/23447, the complete disclosure of which is hereby incorporated by reference. The crosslinker containing blocked isocyanate groups has to be stored cool because the glass transition temperature (Tg) of the crosslinker is close to room temperature. This is a disadvantage in the preparation of a powder paint, which involves dry mixing of the various components (polymers, crosslinkers, pigments and other additives) in a premix, prior to final preparation of the paint in the extruder. It appears to be very difficult to make a homogeneous premix from a large quantity of gluey or liquid material.

Powder coatings are of interest in the automotive industry.

The clear top coats that are used according to the state of the art in the automotive industry as a two-component system are solvent-containing paint systems on the basis of acrylate resins, and cured with isocyanates. In order to meet the requirements concerning reduction of solvents emission, so-called 'high solids' systems are already used. The only way to reduce the emission of solvents even further is to use powder coatings for the clear coat on cars (Lattke, E. 'Pulverlack am Auto aus der Sicht der Autoindustrie', presented at 'Der Pulvertreff '92', 23.01.92, Munich), the complete disclosure of which is hereby incorporated by reference.

However, powder paint systems for automotive application will have to meet the same requirements as the solvent-containing systems. These requirements relate for instance to flow, chemical resistance, gloss and outdoor durability (Kinza, W. 'Pulverklarlack für die Karosseriebeschichtung', presented at 'Die EPS-Praxis 1991', 25.11.91, Bad Nauheim, the complete disclosure of which is hereby incorporated by reference). The aim is to realize these properties at a curing temperature between for instance 140° C. and 170° C. Among the current powder resin systems there are no systems known which possess the required combination of propertes. Although a number of properties can be achieved with systems on the basis of an acid/epoxy curing reaction, the required combination of good flow, good chemical resistance, high gloss, high scratch resistance, good mechanical properties and good outdoor durability has never been obtained with powder coatings.

SUMMARY AND OBJECTS OF THE PRESENT INVENTION

Objects of the present invention include providing a binder composition for powder paints wherein the binder composition comprises a hydroxyl functional polymer and a crosslinker containing blocked isocyanate groups and wherein the powder paint composition can be cured to a powder coating at a relatively low temperature (for instance between 130° C. and 170° C. and in 10 to 30 minutes). The binder composition should also result in powder paint compositions having a combination of desired properties and in a powder stable system, in which the powder paint particles do not tend to agglomerate.

The powder paint binder composition of the present invention comprises (a) a hydroxyl functional polymer, and (b) a crosslinker including (i) a crystalline aliphatic $C_3$–$C_{50}$ compound containing blocked isocyanate groups, and (ii) an amorphous $C_3$–$C_{50}$ aliphatic compound containing blocked isocyanate groups.

The binder composition according to the invention results in powder coatings meeting the above-described objectives and offering good flow, flexibility, outdoor durability and clearness. The powder paint composition can be cured at temperatures of for instance between 130° C. and 170° C. and in 10 to 30 minutes.

DETAILED DESCRIPTION OF THE PRESENT INVENTION

The crystalline and amorphous crosslinker compounds can be prepared for example, from aliphatic groups containing diisocyanates. The aliphatic diisocyanate compounds are preferred because aromatic isocyanates tend to yellow in outdoor use. Preferably, the aliphatic blocked isocyanate compounds are $C_3$–$C_{50}$ compounds. More preferably, the aliphatic blocked compounds are $C_5$–$C_{35}$ compounds. Examples of isocyanate compounds include 1,1-methylene bis-4-isocyanate cyclohexane ($H_{12}$MDI), isophoronediisocyanate isocyanurate (for instance, T 1890™; Chemische Werke Hüls), 1,3-bis(1-isocyanate-1-methylethyl)benzene (TMXDI), 1,6-hexamethylene diisocyanate (for instance Tolonate HDT™ from Rhone Poulenc) and hexamethylene diisocyanate trimer (for instance Tolonate HD™ from Rhone Poulenc or Desmodur N3300™ from Bayer).

The binder composition according to the present invention preferably contains blocked 1,6-hexamethylene diisocyanate trimer (HDT) as amorphous compound, and blocked 1,6-hexamethylene diisocyanate (HDI) as crystalline compound. Preferably 1,2,4-triazole is the blocking agent.

The crosslinker obtained in this way is a mixture of an amorphous and a (semi)crystalline compound. Said mixture is a solid compound at room temperature (about 25° C.) that can be handled very easily. Generally, the melting point of the product is between about 50° C. and about 130° C., and preferably between about 90° C. and about 125° C.

This crosslinker can be ground and pulverized in an excellent manner and can be used in combination with hydroxyl functional resins in clear as well as in pigmented systems.

The equivalent ratio with respect to equivalents of blocked isocyanate groups between the crystalline compound (i) and the amorphous compound (ii) is between about 8:2 and about 3:7 and is preferably between about 7:3 and about 6:4.

The hydroxyl functional polymer is preferably a polyester, a polyacrylate or a mixture of both.

Preferably the polyester has a hydroxyl number of between 20 and 100 mg of KOH/gram of resin and an acid number of less than 10 mg of KOH/gram of resin.

Preferably the polyacrylate has a hydroxyl number of between 40 and 150 mg of KOH/gram of resin and an acid number of less than 20 mg of KOH/gram of resin.

The curing reaction of isocyanates and hydroxyl compounds is described by Misev, Powder Coatings, Chemistry and Technology, pp. 56–68 (John Wiley, 1991), the complete disclosure of which is hereby incorporated by reference. The preparation of powder paints and the curing reactions thereof to obtain powder coatings are generally described in said book at pp. 42–45, the complete disclosure of which is hereby incorporated by reference.

The weight ratio between the polymer containing hydroxyl groups and the crosslinker can be between about 95:5 and about 50:50, and preferably, between 93:7 and 70:30. This ratio depends on, among other factors, the hydroxyl number of the polymer.

The hydroxyl functional polymers can be mixed with the blocked crosslinker by extrusion, for instance, at a temperature of about 100° C. The curing takes place at temperatures of, for instance, between about 130° C. and about 170° C. (in, for instance, about 10–40 minutes), and preferably below about 150° C.

Additives, such as for example fillers, catalysts, curing agents, flow agents and/or stabilizers and, if required, pigments, can be added to the coating systems, preferably before the extrusion.

Suitable polyesters can be obtained via customary preparation methods from carboxylic acids or equivalents thereof. Use of mainly aromatic carboxylic acids is preferred. Examples include phthalic acid, isophthalic acid, terephthalic acid, pyromellitic acid, trimellitic acid, 3,6-dichlorophthalic acid, tetrachlorophthalic acid, and in so far as available, equivalents like anhydrides, acid chlorides or lower alkyl esters thereof. Generally the carboxylic acid component comprises at least 50 wt. %, and preferably at least 70 mol % isophthalic acid and/or terephthalic acid.

Preferably the diol component of the polyester is an aliphatic diol. Examples include thylene glycol, propane-1, 2-diol, propane-1,3-diol, butane-1,2-diol, butane-1,4-diol, butane-1,3-diol, 2,2-di-methylpropane diol-1,3 (=neopentyl glycol), hexane-1,6-diol, 2,2-[bis(2-hydroxyethoxy)] phenylpropane and smaller quantities of polyols, such as for example glycerol, hexane triol, pentaerytritol, sorbitol, trimethylol ethane, trimethylol propane and tris-(2-hydroxy)-isocyanurate, can be used as alcohols. It is also possible to use epoxy compounds instead of diols and polyols, respectively. The alcohol component preferably contains at least 50 mol % neopentylglycol.

Preferably, neopentylglycol and/or trimethylol propane are used as alcohols because they give good outdoor durability.

In addition, the polycarboxylic acids applied can be cycloaliphatic and/or acyclic polycarboxylic acids. Examples include cyclohexane dicarboxylic acid, tetrahydrophthalic acid, hexahydroendomethylene tetrahydrophthalic acid, azelainic acid, sebacic acid, decane dicarboxylic acid, adipic acid, succinic acid, and maleic acid. The amount of cycloaliphatic and/or acyclic polycarboxylic acid can be up to about 30 mol %, and preferably up to about 20 mol %, relative to the total of carboxylic acids. Hydroxycarboxylic acids and/or, optionally, lactones can also be used. Examples include 12-hydroxylstearic acid, epsilon caprolactone and hydroxypivalic ester of neopentyl glycol. Monocarboxylic acids can also be added in minor amounts, for example less than 5% by weight during the preparation. Examples include benzoic acid, tert.-butylbenzoic acid, hexahydrobenzoic acid and saturated aliphatic monocarboxylic acids.

The polyesters can be prepared by esterification or transesterification known to those skilled in the art. Customary catalysts optionally can be used. Examples include dibutyl tin oxide or tetrabutyl titanate. The preparation conditions and the COOH/OH ratio are chosen so that a polyester resin is obtained having the desired hydroxyl number and acid number being for example a hydroxyl number of between about 20 and about 100 mg of KOH/gram of resin and an acid number of less than about 10 mg of KOH/gram of resin.

Preferably polyesters are based on about 40–100 mol % isophthalic acid and about 0–60 mol % terephthalic acid as dicarboxylic acids (wherein the quantities of isophthalic acid and terephthalic acid together amount to 100 mol %). Preferably, the amount of isophthalic acid is more than 60 mol %.

Optionally, the polyester can also be based on more than two dicarboxylic acids.

Preferably, the amount of three or higher functional monomer is less than about 12 mole % relative to the other monomers. The number average molecular weight (Mn) is preferably between about 1,500 and 5,000. Preferably, the molecular weight, and the amount of branching component is chosen such that the functionality (referring to the amount of branching) of the polyester is between about 2,0 and 4,0.

The hydroxyl functional acrylate resin can be, for example, based on hydroxyethyl (meth)acrylate, hydroxypropyl (meth)acrylate and methyl (meth)acrylate. The resin can also be based on (meth)acrylic acid and alkyl esters of (meth)acrylic. Examples include ethyl (meth)acrylate, isopopyl (meth)acrylate, n-butyl (meth)acrylate, n-propyl (meth)acrylate, isobutyl (meth)acrylate, ethylhexyl acrylate and/or cyclohexyl (meth)acrylate. Vinyl compounds such as for instance styrene can also be used.

According to a preferred embodiment of the invention, the hydroxyl functional acrylate resin is based on i) about 8–30 wt. % hydroxyethyl acrylate, ii) about 5–25 wt. % n-butyl methacrylate and iii) about 50–80 wt. % methyl methacrylate (i+ii+iii=100 wt. %).

Hydroxyl functional acrylate resins can be prepared in a polymerization reaction, in which a solvent, such as for instance toluene, xylene or butyl acetate, is supplied to a reactor. Then heating to the desired reaction temperature, such as for instance to the reflux temperature of the solvent is effected. Then, for a period of for instance between 2 and 4 hours monomers, initiator and, optionally, mercaptan are added. Then the temperature is kept at the reflux temperature for two hours for instance. Next, the solvent is distilled off by raising the temperature and subsequently a vacuum distillation is carried out, for one to two hours for instance. The final product is drained and cooled.

The powder paint formulations produced with the binder composition according to the invention can be used for instance on metal, plastic and wood.

The powder paint formulations according to the invention can be used for instance for powder coatings that are suitable for domestic appliances, for industrial applications and automotive applications such as topcoats.

The coatings obtained can be applied on motorcar components such as wheels, wheel caps, doors and wings.

Thermosetting powder paint compositions for industrial coatings are described generally in Misev, Powder Coatings, Chemistry and Technology at pp. 131–173 and 224–228, the complete disclosure of which is hereby incorporated by reference.

Powder paint binder compositions are described in Belgium application 9400850 filed Sep. 21, 1994.

The invention will be elucidated by means of the following, non-restrictive experiments and examples.

EXAMPLES

Experiment 1
Preparation of an acrylate resin 1650 grammes of toluene was supplied to a 6-litre reactor vessel equipped with a thermometer, a stirrer and a reflux cooler. With stirring and while a nitrogen flow was passed through the reactor, the temperature was raised to reflux temperature. Initiator tert.butylperoxy-2-ethyl-hexanoate (Triganox 21S™; AKZO) was dissolved in the mixture of monomers in amounts given in Table 1, the total monomer quantity being 3300 grams. Next, this mixture was supplied to the reactor in 3 hours. The temperature in the reactor was kept at reflux temperature. Immediately after the monomer mixture had been supplied, an additionally quantity of initiator was added. Two hours after the monomers had been supplied a separation vessel was included in the set-up. By gradually increasing the temperature and by drawing a vacuum, the solvent was removed.

Table 1 shows the quantities of monomer and initiator (in grams), the viscosity (measured with an Emila rheometer; dPa.s, 165° C.) and the glass transition temperature (Tg, Mettler TA-3000, 5° C./min system).

TABLE 1

|  | exp. 1 |
|---|---|
| HEA[1] | 683.1 |
| MMA[2] | 2396.9 |
| BMA[3] | 220.0 |
| TRIG 21S[4] | 267.9 |
| TRIG 21S[5] | 11.0 |
| Visc. | 450 |
| Tg | 57 | where:
[1] HEA = hydroxyethyl acrylate
[2] MMA = methyl methacrylate
[3] BMA = n-butyl methacrylate
[4] TRIG 21S = Trigonox 21S (AKZO)
[5] quantity of Trigonox 21S as afterinitiator

Example I
Preparation of the crosslinker

A 2-litre reactor vessel, equipped with a thermometer, a stirrer and a reflux cooler, was filled with 363 grams of haxamethylene di-isocyanate trimer (Tolonate HDT™; Rhone Poulenc) and 39.7 grams of 1,6-hexamethylene diisocyanate (Tolonate HD™; Rhone Poulenc) (1.89 and 0.47 isocyanate equivalents, respectively). With stirring and while a nitrogen flow was passed through the reactor, the temperature was raised gradually. The reaction mixture was heated to 120° C., after which a total of 163 grams of 1,2,4-triazole (from Chemie Linz) was added in portions. While the portions were added the temperature was held between 120° C. and 125° C. Each successive fresh portion of 1,2,4-triazole was not added until the temperature of the reaction mixture had decreased to 120° C. again. Ten minutes after the last portion of 1,2,4-triazole had been added the NCO content of the reaction mixture was determined by means of titration. When the NCO content had declined to almost 0, the crosslinker product was removed from the reactor and cooled.

Examples II–VII

Example I was repeated, with the equivalent ratio between Tolonate HDT and Tolonate HD, being varied as shown in Table 2. The glass transition and melting temperatures for Examples I–VIII are also given in Table 2.

TABLE 2

|  | I | II | III | IV | V | VI | VII |
|---|---|---|---|---|---|---|---|
| HDT[1] | 8 | 6,66 | 6,5 | 6,2 | 6 | 5 | 3 |
| HD[2] | 2 | 3,33 | 3,5 | 3,8 | 4 | 5 | 7 |
| Tg (°C.)[3] | 13 | 15 | 14 | 14 | 12 | 10 | 11 |
| Tm (°C.)[4] | 105 | 101 | 105 | 105 | 107 | 104 | 101 |

[1] HDT = Tolonate HDT ™; Rhône Poulenc
[2] HD = Tolonate HD ™; Rhône Poulenc
[3] Tg = glass transition temperature determined by means of DSC, Mettler TA-3000, 5° C./min system
[4] Tm = melting point determined by means of DSC, Mettler TA-3000, 5° C./min system

Example VIII
Preparation of binder composition and powder paint

A powder paint formulation was prepared by mixing 546 grams of polyester resin Uralac P6204 (DSM Resins BV), 54 grams of crosslinker according to Example III, 300 grams of titanium dioxide pigment (KRONOS 21607™), 9 grams of flowing agent (acrylate copolymer on silica; Resiflow PV 5™; Worlee) and 3.5 grams of benzoin (degassing agent). This mixture was extruded by means of a laboratory extruder (Buss Ko-Kneter, PLK 46B) at 130° C. with a speed of 60 rpm. The extrudate was cooled, ground and screened. The screen fraction smaller than 90 microns was used as powder paint. This powder paint was sprayed electrostatically onto aluminium panels. The spray-coated panels were enamelled in an oven at 150° C. for 30 minutes. The obtained powder coatings showed very advantageous properties such as for example very good flow, high gloss and full impact.

Example IX

A powder paint formulation was prepared using 432 grams of polyacrylate according to Experiment I, 168 grams of crosslinker according to Example III, 4 grams of flowing agent (acrylate copolymer, BYK 361™; BYK), 2 grams of benzoin (degassing agent) and 0.1 gram of catalyst (butyltintris-2-ethylhexoate; Fastcat 4102™, M&T Chemicals). This mixture was mixed in an extruder at 120° C. with a speed of 220 rpm. The extrudate and the powder paint were processed further as described in Example VIII, after which curing took place in 30 minutes at 150° C. The cured coating had a good flow, a good appearance and a flexibility of more than 7 mm according to the 'Erichsen Slow Penetration' test (according to ISO-1520/DIN 53156). The petrol resistance, determined by contacting the coating for 2 hours with a petrol-drenched wad of cotton wool under a piece of glass plate, followed by visual assessment of the coating, was rated as 'very good' because the coating was not damaged.

The examples show that the combination of very flexible isocyanate compounds Tolonate HDT and Tolonate HD with 1,2,4-triazole as a blocking agent result in crosslinkers that are suitable for use in powder coatings. An essential feature of these kind of crosslinking compounds is that the combination of flexibility and low deblocking temperature can offer powder coating formulations that have good mechanical properties when cured at relatively low temperatures.

While the invention has been described in detail and with reference to specific embodiments thereof, it will be apparent to one of ordinary skill in the art that various changes and modifications can be made therein without departing from the spirit and scope thereof.

We claim:

1. A powder coating binder composition comprising (a) a hydroxyl functional polymer, (b) a crosslinker, wherein said crosslinker includes (i) a blocked 1,6-hexamethylene diisocyanate, and (ii) a blocked trimer of 1,6-hexamethylene diisocyanate wherein 1,2,4-triazole is the blocking agent.

2. A binder composition according to claim 1, wherein the amount of said polymer (a) is about 50–95 wt. %, and the amount of said crosslinker (b) is about 5–50 wt. % with respect to the total weight of components (a) and (b).

3. A binder composition according to claim 2, wherein the amount of said polymer (a) is about 70–93 wt. %, and the amount of said crosslinker (b) is about 7–30 wt. %, with respect to the total weight of components (a) and b).

4. A binder composition according to claim 1, wherein the equivalent ratio with respect to equivalents of blocked isocyanate groups between said 1,6-hexamethylene diisocyanate (i) and said trimer of 1,6-hexamethylene diisocyanate (ii) is between about 8:2 and about 3:7.

5. A binder composition according to claim 1, wherein the equivalent ratio with respect to equivalents of blocked isocyanate groups is between about 7:3 and about 6:4.

6. A binder composition according to claim 1, wherein said polymer (a) is a hydroxyl functional polyacrylate having monomer repeat units which are comprised of:

i) about 8–30 wt. % hydroxyethyl acrylate, ii) about 5–25 wt. % n-butyl methacrylate, and iii) about 50–70 wt. % methyl methacrylate wherein the total amounts of i+ii+iii=100 wt. %.

7. A binder composition according to claim 1, wherein said polymer (a) is a hydroxyl functional polyester having: (i) a carboxylic acid component of about 40–100 mole % isophthalic acid and about 0–60 mole % terephthalic acid, said mole % of isophthalic acid based on the total amount of carboxylic acid component, (ii) an alcohol component of at least about 50 mole % neopentylglycol based on the total amount of alcohol component, and (iii) a hydroxyl number between about 20–100 mg of KOH per gram of polymer and an acid number of less than about 10 mg of KOH per gram of polymer.

8. A binder composition according to claim 1, wherein said crosslinker (b) is a solid at about 25° C. and has a melting point between about 50°–130° C.

9. A binder composition according to claim 1, wherein said crosslinker (b) is a solid at about 25° C. and has a melting point between about 90°–125° C.

10. A powder paint comprising a binder composition according to claim 1, and at least one of the following additives selected from the group consisting of pigment, catalyst, flow agent, curing agent, filler, degassing agent, and stabilizer.

11. A powder coating binder composition comprising (a) at least one hydroxyl-functional polymer from the group consisting of a synthetic polyester, a synthetic polyacrylate, and a mixture thereof;

(b) a crosslinker, wherein said crosslinker includes, (i) a semi-crystalline compound which is a blocked 1,6-hexamethylene diisocyanate wherein the isocyanate groups have been blocked with 1,2,4-triazole, and, (ii) an amorphous compound which is a blocked trimer of 1,6-hexamethylene diisocyanate wherein the isocyanate groups have been blocked with 1,2,4-triazole.

12. A process for the preparation of a powder coating comprising the steps of applying the powder coating according to claim 10 to a substrate, and curing said powder paint composition at a temperature between about 130°–170° C. in about 10–40 minutes.

13. A coated substrate comprising a substrate having wholly or partly coated thereon a powder coating according to claim 10.

14. A composition comprising (a) a hydroxyl functional polymer, (b) a semicrystalline $C_3$–$C_{50}$ aliphatic compound containing blocked isocyanate groups, and (c) an amorphous $C_3$–$C_{50}$ aliphatic compound containing blocked isocyanate groups, wherein 1 2,4-triazole is the blocking agent.

15. A binder composition according to claim 14, wherein component (i) and component (ii) are blocked di-isocyanates or blocked tri-isocyanates.

16. A binder composition according to claim 14, wherein the isocyanates from which the blocked isocyanates of compound (i) and compound (ii) are obtained are selected from the group consisting of 1,1-methylene bis-4-isocyanate cyclohexane, isophoronediisocyanate isocyanurate, 1,6-hexamethylene diisocyanate, and hexamethylene diisocyanate trimer.

17. A binder composition according to claim 14, wherein said components (i) and (ii) are $C_5$–$C_{35}$ aliphatic compounds.

* * * * *